(12) United States Patent
Wagemann et al.

(10) Patent No.: US 9,649,893 B2
(45) Date of Patent: May 16, 2017

(54) ROTARY FEEDTHROUGH

(71) Applicant: CLAAS SELBSTFAHRENDE ERNTEMASCHINEN GMBH, Harsewinkel (DE)

(72) Inventors: Sebastian Wagemann, Oelde (DE); Andreas Krauss, Harsewinkel (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 412 days.

(21) Appl. No.: 14/291,519

(22) Filed: May 30, 2014

(65) Prior Publication Data

US 2014/0363271 A1    Dec. 11, 2014

(30) Foreign Application Priority Data

Jun. 7, 2013    (DE) .......................... 10 2013 105 890

(51) Int. Cl.
 *B60C 23/00* (2006.01)
 *F16L 27/087* (2006.01)

(52) U.S. Cl.
 CPC .......... *B60C 23/003* (2013.01); *F16L 27/087* (2013.01)

(58) Field of Classification Search
 CPC ........................... B60C 23/001; B60C 23/003
 USPC ................................................. 152/415–417
 See application file for complete search history.

(56) References Cited

U.S. PATENT DOCUMENTS

| 6,439,044 | B1 * | 8/2002 | Tigges | .................. | B60C 23/003 |
| | | | | | 73/146.2 |
| 8,783,314 | B2 * | 7/2014 | Tigges | .................. | B60C 23/003 |
| | | | | | 141/38 |
| 8,910,946 | B2 * | 12/2014 | Meller | .................. | F16L 27/087 |
| | | | | | 277/408 |
| 9,352,622 | B2 * | 5/2016 | Tigges | .................. | B60C 23/003 |
| 2009/0211682 | A1 | 8/2009 | Sobotzik | | |
| 2009/0283190 | A1 * | 11/2009 | Padula | .................. | B60C 23/003 |
| | | | | | 152/417 |

FOREIGN PATENT DOCUMENTS

| DE | 10 2005 006 073 | 8/2006 |
| DE | 10 2005 018 584 | 10/2006 |

* cited by examiner

*Primary Examiner* — Jason Bellinger
(74) *Attorney, Agent, or Firm* — Michael J. Striker

(57) ABSTRACT

A rotary feedthrough for a compressed air supply system is provided between a stator and a rotor rotating relative to this stator. A compressed air channel disposed in the stator is connected to a compressed air line and leads into an annular chamber formed in the rotor, from which at least one working channel leading to a consumer proceeds. The stator is connected in the region of the rotary feedthrough to a control line. A moment of friction occurring in the region of the rotary feedthrough resulting in premature wear is reduced by providing a switchable non-return valve in the annular chamber. Blocking elements which extend within the annular chamber concentrically to the rotational axis of the rotor are moveable into an open position by an actuating element, which is displaced from the stator in the direction of the blocking elements.

15 Claims, 2 Drawing Sheets

ROTARY FEEDTHROUGH

CROSS-REFERENCE TO A RELATED APPLICATION

The invention described and claimed hereinbelow is also described in German Priority Document DE 10 2013 105890.6, filed on Jun. 7, 2013. The German Priority Document, the subject matter of which is incorporated herein by reference, provides the basis for a claim of priority of invention under 35 U.S.C. 119(a)-(d).

The invention relates to a rotary feedthrough for a compressed air supply system positioned between a stator and a rotor rotating relative to this stator. A compressed air channel disposed in the stator is connected to a compressed air line and leads into an annular chamber formed in the rotor, from which at least one working channel leading to a consumer proceeds. The stator is connected in the region of the rotary feedthrough to a control line.

Rotary feedthroughs are used in order to transfer gaseous or liquid media between two components that are rotating relative to one another. In the case of a gaseous medium, this gaseous medium can be pressurized or can be transferred with an underpressure. In the latter case, a vacuum can be transferred via the rotary feedthrough. The components are usually a stationary component, which is referred to in the following as a stator, and a component rotating relative thereto, which is referred to as a rotor. It is also possible for the two components to be rotatably driven at different speeds or in opposite directions.

Such rotary feedthroughs are used on agricultural working vehicles (e.g., tractors and self-propelled harvesting machines), for tire pressure control systems in order to allow the pressure in the tires of the drive wheels to be changed during travel across a field or a road. During operation of the agricultural working vehicle on a field, the tire pressure is reduced, in particular, when the traction behavior of the tires should be improved due to certain ground conditions. In addition, the tire pressure can be lowered in order to reduce the ground compression resulting from the weight of the working vehicle as the ground contact surface of the tire is increased in this case. On the other hand, the tire pressure should be increased for road travel or for travel on a solid surface. The higher air pressure of the tires is required for road travel in order to achieve sufficient driving stability of the working vehicle and to reduce the tire wear overall.

A rotary feedthrough for a compressed air supply system is known from DE 10 2005 018 584 A1. This rotary feedthrough is used, within the framework of a tire filling system of an agricultural tractor, to transfer compressed air between a stator, which is connected to an axle body, and a rotor, which is provided on a wheel hub. In this case, a compressed air channel extending in the stator leads into a gap provided between the stator and the rotor, via which the compressed air can enter the working channel of the rotor in any position of the rotor. Two brush seals are disposed in the stator, concentrically to the longitudinal axis of the wheel hub. The brush seals seal the gap radially outwardly and radially inwardly. A control line connected to a control channel extends in the stator.

The control channel also is connected via a gap between provided the stator and the rotor to a control channel extending in the rotor. This connection is sealed off by concentrically extending brush seals. The brush seals disposed in grooves of the stator comprise metallic and/or non-metallic fibers or threads, the ends of which slide on the surface of the rotor facing these ends and thereby outwardly seal off the two intermediate spaces provided for the transfer of compressed air. A tire valve is provided in the tire, by which the tire is filled with compressed air from the working channel. In order to reduce the pressure in the tire, this tire valve is opened in a corresponding manner via the control channel until the intended tire pressure has been reached.

Document DE 10 2005 006 073 A1 makes known a rotary feedthrough having a design that substantially matches that of the rotary feedthrough according to DE 10 2005 018 584 A1. Seals are used in this case, however, instead of the brush seals disposed between the stator and the rotor. These seals have a U-shaped cross-section and are intended to be resiliently elastic. In the case of this previously known rotary feedthrough for a tire filling system as well, first compressed air channels for filling the tire are provided. The first compressed air channels communicate with one another via an annular chamber, and second compressed air channels are provided, which are designed as control channels and communicate with one another via a further annular chamber. The two U-shaped seals slide on the surfaces of the stator and the rotor that face one another.

SUMMARY OF THE INVENTION

The present invention overcomes the shortcomings of known arts, such as those mentioned above.

To that end, the present invention provides for reducing the moment of friction occurring in the region of a rotary feedthrough designed according to the conventional arts, such as that described above, wherein this moment of friction results in a temperature increase on the sliding surfaces of the seal and in the premature wear thereof.

The invention also provides a rotary feedthrough that can be produced in a more cost-favorable manner and that has a favorable installation-space requirement, as compared to those known in the conventional art.

In an embodiment, the invention provides a rotary feedthrough for a compressed air supply system disposed between a stator and a rotor rotating relative thereto, where a compressed air channel disposed in the stator is connected to a compressed air line and leads into an annular chamber formed in the rotor from which a working channel leading to a consumer proceeds and wherein the stator is connected in the region of the rotary feedthrough to a control line. Additionally, a switchable non-return valve is disposed in the annular chamber with blocking elements extending within the annular chamber concentrically to the rotational axis of the rotor. The blocking elements are moveable into an open position by an actuating element in this region, which is displaceable from the stator in the direction of the blocking elements.

The blocking elements used within the framework of the switchable non-return valve are therefore rotationally symmetrical. Consequently, in any position of the rotor that this rotor assumes relative to the stator, the actuating element impacts the blocking elements and can open these blocking elements in this region. As a result, a connection is established between the compressed air channel provided in the stator and the working channel disposed in the rotor. The connection allows the compressed air to flow into the working channel or to flow out of this working channel. Since the rotary feedthrough according to the invention does not establish a permanent connection between the two channels, which would have to be sealed by means of axial or radial sealing rings in this case, an increased moment of friction due to the actuating element engaging in the blocking elements takes effect only upon actuation of the switchable non-return valve.

The invention renders it possible to largely prevent wear and a temperature increase in the region of the rotary feedthrough. In addition, a corresponding rotary feedthrough can be produced cost-favorably within the framework of a large-quantity lot. Accordingly, the corresponding components can be favorably installed and removed, simplifying maintenance or repair work.

The inventive feedthrough arrangement also has the advantage that an axial offset that may occur between the stator and the rotor does not negatively affect the function of the rotary feedthrough. And, it is possible to arrange the components of the rotary feedthrough within the framework of a kinematic reversal such that the annular chamber is formed in the stator and accommodates the blocking elements of the is switchable non-return valve in a corresponding manner. As such, the actuating element is displaceably disposed in the rotor.

In contrast, documents DE 10 2005 018 584 A1 and DE 10 2005 006 073 A1 describe only a permanently acting sealing arrangement within the respective rotary feedthrough. The brushes or sealing lips of this sealing arrangement, which face in the axial direction, are guided on sliding surfaces of the rotor and of the stator. If corresponding rotary feedthroughs are formed with a large diameter, a considerable moment of friction occurs on a permanent basis, since this moment of friction increases over-proportionally to the diameter of the rotary feedthrough. This moment of friction also is considerably increased under the influence of the overpressure present in the rotary feedthrough when the corresponding floating-ring seals or brush seals are formed with a considerable diameter, which is usually the case. The overall friction that occurs on seals subjected to pressure has a negative effect on the efficiency of thusly equipped motor vehicles such that fuel consumption is increased. Furthermore, the known systems are very susceptible to interference in the case of axial offset of the stator and rotor, which rotate relative to one another, since this usually results in seal failure.

In contrast, the invention provides an embodiment wherein the annular chamber within the rotor is designed as a radial peripheral groove or as an end-face groove. When a radial peripheral groove is used, the actuating element extends radially to this peripheral groove and is radially displaced such that this actuating element engages into the blocking elements, which block the air flow, at points or across a small peripheral section. The actuating element opens these blocking elements, thereby allowing the compressed air to flow between the compressed air channel and the working channel. The compressed air channel and the working channel are therefore interconnected, during this phase, by the actuating element engaging into the blocking elements. As an alternative, the blocking elements are disposed in an end-face groove having an annular cross-section, wherein the actuating element is then displaced in the axial direction of the rotor in a corresponding manner, thereby allowing the actuating element to engage into the blocking elements and supply or block the compressed air.

In an embodiment, the actuating element comprises a longitudinally displaceable peg having a head piece and a control element, which cooperates with the control line. The head piece engages, radially or axially, into the blocking elements of the non-return valve in order to establish a connection between the compressed air channel and the working channel. The longitudinally displaceable peg can be embodied as a piston, for example, which is guided in a longitudinally displaceable manner in a housing of the actuating element affixed in the stator. On the end thereof facing the blocking elements of the switchable non-return valve, the corresponding head piece is preferably fastened by a threaded connection. As explained in detail in the following, this head piece has an outer contour that assists in opening the blocking elements without damaging these blocking elements or inducing a substantial moment of friction.

Furthermore, the head piece has a boat-like shape, wherein one tip of the boat-shaped head piece points in the direction of rotation and the other tip points opposite the direction of rotation. As a result, the boat-shaped head piece has a longitudinal extension that is greater than the width thereof. One keel of this boat-shaped head piece can have flat outer jacket surfaces and a narrower width. This keel has rounded edges or be pointed in the direction of rotation and opposite the direction of rotation. The head piece penetrates the blocking elements by this keel and therefore induces the exchange of compressed air between the compressed air channel and the working channel.

To this end, a longitudinal bore extending through the peg and the head piece of the actuating elements is provided. The compressed air channel leads into this longitudinal bore and, therefore, proceeding therefrom, a connection to the working channel is established by the corresponding actuating element.

The non-return valve also can be designed as a plate valve. The blocking elements of this plate valve are retained in the blocking position thereof. In the blocking position, the blocking elements bear against one another, in a sealing manner, due to an inherent preload and by the pressure that is present in the working channel and, therefore, in the annular chamber. The only way to eliminate this blocking effect in the corresponding region is by moving the actuating element against the blocking elements in that the head piece of the actuating element impacts the blocking elements. As a result, the blocking elements lift off of one another along the length of the aforementioned keel, whereupon the keel penetrates the gap that forms. Since the rotor is rotating at this time, this region becomes correspondingly displaced, whereby the blocking elements open in a zipper-like manner in front of the keel and close in a zipper-like manner behind the keel, as viewed in the direction of rotation.

To this end, the blocking elements are produced as cylindrical or circular rings disposed on side walls of the annular chamber and which block the flow of compressed air by the edges thereof that face one another. In the closed state of the plate valve, the adjoining ends of the circular or cylindrical rings extend toward one another in the shape of a "V". In order to lift these ends off of one another, as explained above, the head piece is moved into the acute-angled region thereof formed by the rings.

In an embodiment, the control element embodies an annular piston connected to the peg. In order to displace the head piece in the direction of the blocking elements, this annular piston is acted upon, on at least one end face, by a control pressure from a control channel proceeding from the control line. The annular piston is spring-loaded by a return spring on an end face remote from the end face acted upon by the control pressure. Therefore, the peg is displaced together with the head piece by a control pressure. In this context, the peg is furthermore guided, in a sealing manner, in a receiving bore extending substantially along the same axis as a compressed air channel proceeding from the compressed air line.

As an alternative to the actuation of the peg and the head piece fastened thereon by a control pressure, the control element may comprise an electromagnetic actuator system, thereby making it possible to eliminate a separate connection for a control pressure.

The head piece, which tapers in the direction of the end thereof pointing toward the blocking elements, as described above, can have lateral jacket surfaces with a concave or convex contour, at least in sections, as viewed in a longitudinal sectional view. The shape of the head piece by which the blocking elements can implement this procedure with low friction and low wear in the region in which the head piece lifts these blocking elements off of one another is decisive. Moreover, it is advantageous to provide the head piece with a coating that reduces the friction occurring between the blocking elements and the head piece.

In an embodiment, the rotary feedthrough is provided for a tire pressure control unit of a motor vehicle, wherein the stator is fixedly disposed on an axle housing and the rotor is disposed on a wheel hub, which is rotating relative to the axle housing. As such, the air pressure in a tire of a drive wheel is adjusted during travel by the switchable non-return valve disposed within the annular chamber. To this end, the working channel provided in the rotor is connected to the tire via a working line. The tire pressure is increased or decreased during travel by means of the rotary feedthrough.

BRIEF DESCRIPTION OF THE DRAWINGS

Further features and advantages of the invention will become apparent from the description of exemplary embodiments that follows, with reference to the attached figures, wherein.

DETAILED DESCRIPTION OF THE INVENTION

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
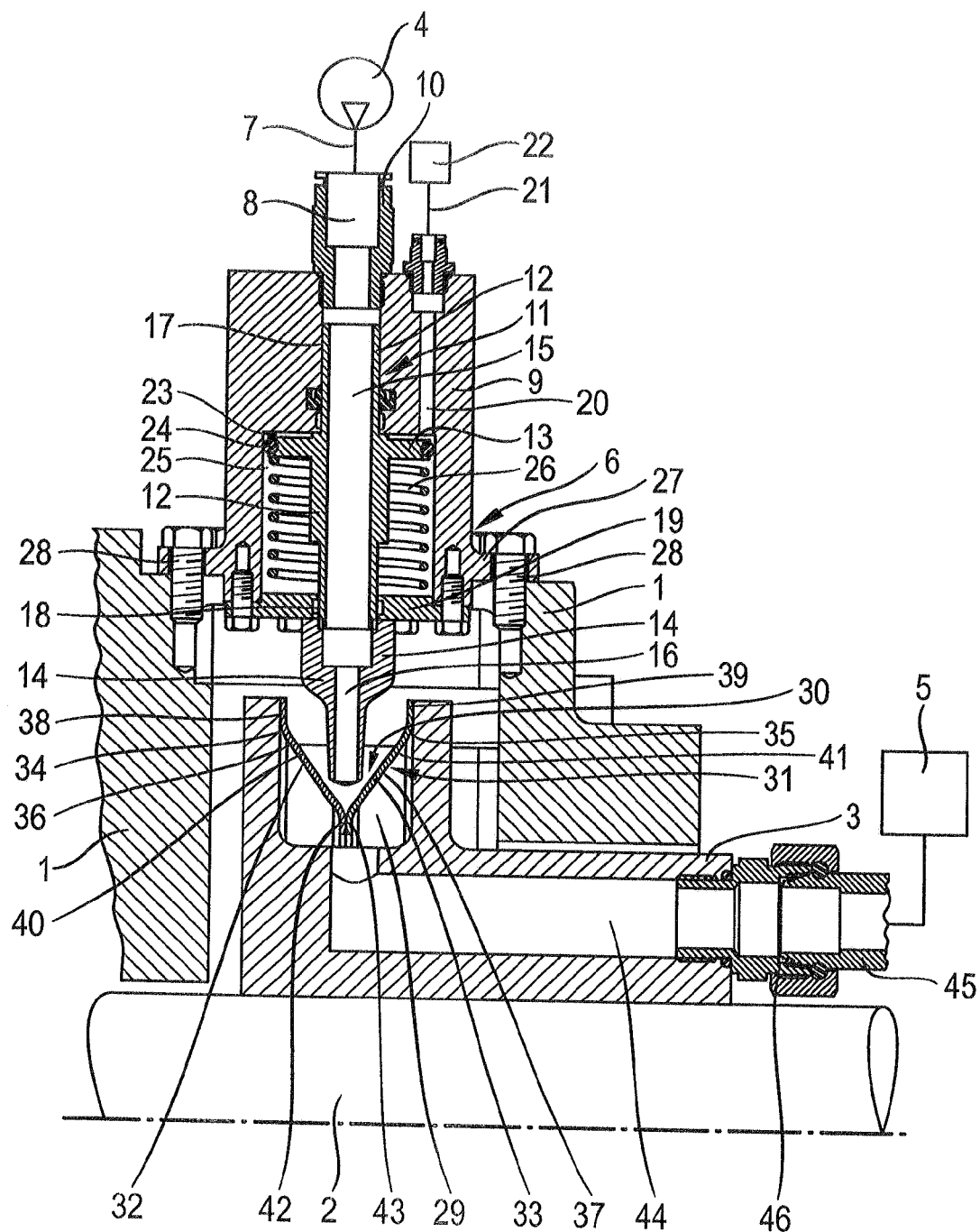
FIG. 1 presents a longitudinal sectional view of a rotary feedthrough arrangement between a stator and a rotor configured according to the invention.

FIG. 1 shows a stator 1, in which a drive shaft 2 is supported via non-illustrated rolling bearings. The drive shaft 2 is connected on the drive side to a transmission, such as a final drive or a differential gear, and, on the output side, drives a drive wheel of the motor vehicle. Furthermore, a rotor 3 is disposed on the drive shaft 2, for example, a wheel hub of the motor vehicle. Since a consumer 5 is supplied with a pressure medium or pressure medium will be removed from this consumer 5 by way of a compressed air source 4 disposed on the stator 1, a rotary feedthrough 6 is disposed between the stator 1 and the rotor 3, wherein this rotary feedthrough is the subject matter of this invention.

In this case, the compressed air is fed from the compressed air source 4 via a compressed air line 7 to the pressure-medium feedthrough 6, wherein the pressure-medium feedthrough 6 comprises a compressed air channel 8. This compressed air channel 8, which is formed by a coupling 10 screwed into a housing 9 of the pressure-medium feedthrough 6, extends into the interior of an actuating element 11. The actuating element 11 comprises a tubular peg 12, an annular piston 13, and a head piece 14 connected to the peg 12. The peg 12 is provided with a longitudinal bore 15 in the interior thereof. The longitudinal bore extends from the compressed air channel 8 to the head piece 14. The head piece 14 has a connecting bore 16, which terminates at an end of the head piece 14 remote from the peg 12. The peg 12 extends, in the upper region thereof, in a guide bore 17 of the housing 9 and, in the lower region thereof, in a receiving bore 18 of a cover 19, which closes the housing 9 in the axial direction.

A control channel 20 is located in the housing 9, extends substantially parallel to the peg 12 and is connected to a control unit 22 via a control line 21. The control line 21 extends into a pressure chamber 23, which annularly encloses the peg 12 and is provided on one side of the annular piston 13. In addition, the annular piston 13 comprises a piston ring 24, by which the annular piston 13 is guided in a sealing manner in a cylinder 25 formed within the housing 9. The annular piston 13 is acted upon, on the end face thereof remote from the pressure chamber 23, by the force of a return spring 26. The return spring 26 bears against a cover 19 at the other end thereof. The housing 9 comprises a mounting flange 27, via which this housing is fixed on the stator 1 by screws 28.

The rotary feedthrough 6 also has an annular chamber 29 formed in the rotor 3, which is embodied as a U-shaped, radial peripheral groove of the rotor 3. A switchable non-return valve 30 embodied as a plate valve 31 is disposed within the annular chamber 29. The plate valve 31 comprises blocking elements 32 and 33, which are assigned to the side walls 34 and 35, respectively, of the annular chamber 29. The two blocking elements 32 and 33, which are embodied as profiled, annular rings 36 and 37, each have a first radially extending section 38 and 39, respectively, by which the blocking elements are affixed on said side walls 34 and 35 of the annular chamber 29. Diagonally extending sections 40 and 41 proceed from the radially extending sections 38 and 39, respectively, and extend toward one another, thereby forming an acute angle. These diagonally extending sections 40 and 41 form second radially extending sections 42 and 43, which bear against one another in a sealing manner and therefore radially outwardly seal off the annular chamber 29. Adjoining the annular chamber 29 is a working bore 44, which first extends radially and then axially, into the end of which a coupling 46 connected to a working line 45 is screwed. The consumer 5 is connected to this working line 45, to which said consumer compressed air shall be supplied or from which compressed air shall be removed during rotation of the rotor 3.

Figure 2:
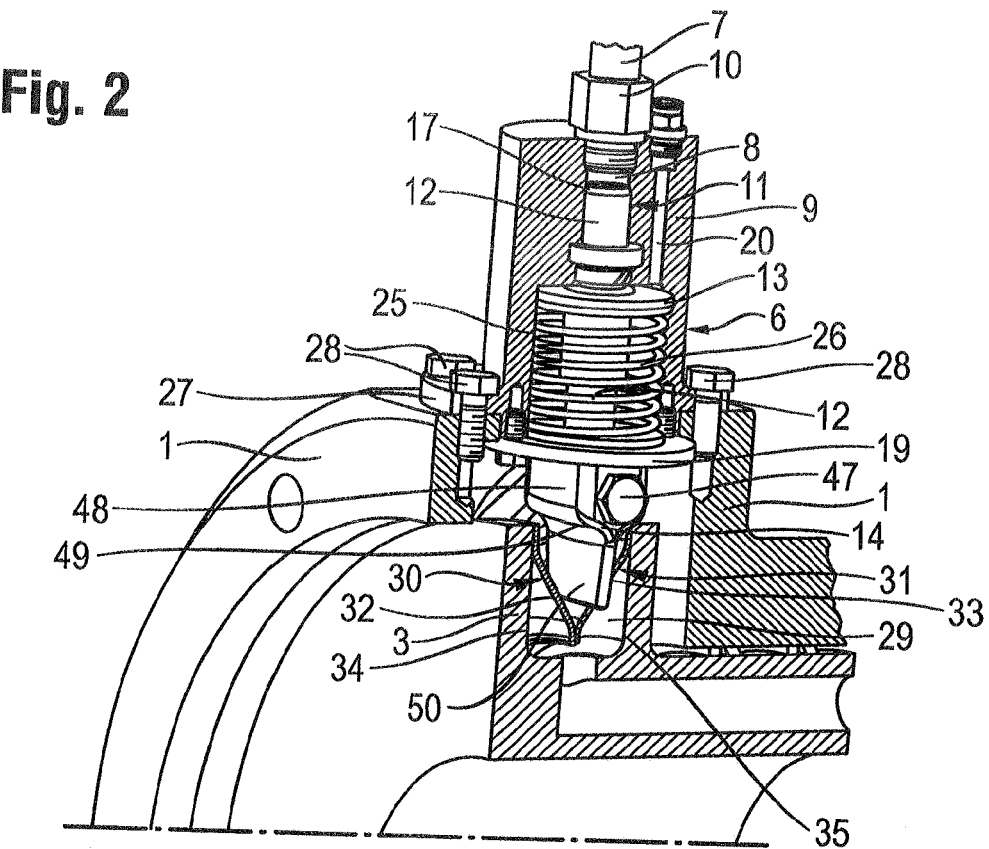
FIG. 2 presents a perspective representation of the rotary feedthrough depicted in FIG. 1 to highlight an actuating element used in the rotary feedthrough.

FIG. 2 presents a perspective sectional representation of the arrangement of the rotary feedthrough 6 between the stator 1 and the rotor 3 to highlight the special configuration of the head piece 14, which is connected to the peg 12 via a screw 47. As shown, the head piece 14 has a boat-like shape. The head piece has a collar 48, the longitudinal sides of which transition into a keel 50 via a concavely curved section 49.

The function of the arrangement 6 shall now be described with reference to FIGS. 1 and 2. For example, when the objective is to convey compressed air from the compressed air source 4 into the consumer 5, pressure is applied to the pressure chamber 23 proceeding from the control unit 22, via the control line 21 and the control bore 20. The annular piston 13 is therefore displaced in the direction of the cover 19 against the force of the return spring 26. As a result, the peg 12 moves the head piece 14 radially in the direction of the blocking elements 32 and 33 of the switchable non-return valve 30. The keel 50 is thereby guided between the second radially extending sections 42 and 43 of the rings 36 and 37. Since, in this state, the rotor 3 rotates together with the drive shaft 2, the engagement point of the keel 50 is continuously displaced between the blocking elements 32 and 33. In this state, compressed air is fed via the longitudinal bore 15 of the peg 12, subsequently enters the working channel 44 and is therefore fed to the consumer 5 via the working line 45.

In this case, in which the head piece 14 engages via the keel 50 thereof into the switchable non-return valve 30, compressed air can be directed out of the consumer 5 in the direction of the compressed air source 4 or a compressed air outlet. Once the entire procedure has ended, the pressure on the annular piston 13 is reduced and the peg 12 therefore moves the head piece 14 out of the engagement position thereof between the blocking elements 32 and 33. As a result, the blocking elements 32 and 33, which are embodied as rings 36 and 37, once more bear against one another in a sealing manner, via the second radially extending sections 42 and 43 thereof, around the entire circumference. The pressure-medium connection is therefore blocked.

Figure 3:
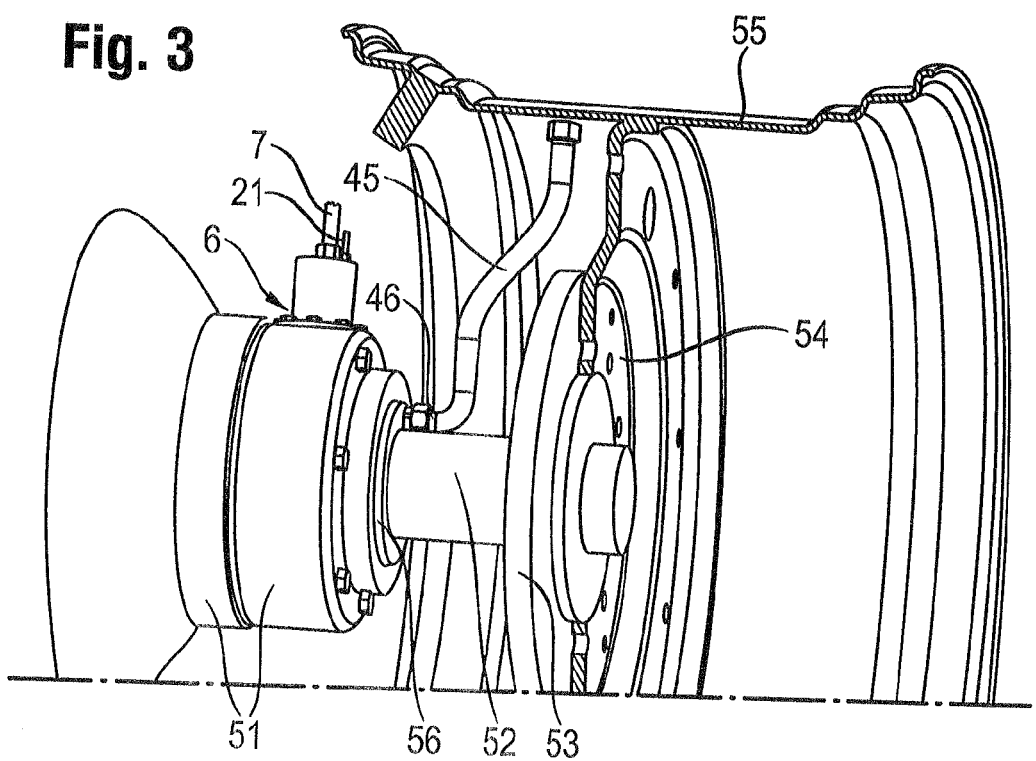
FIG. 3 presents a perspective view of the rotary feedthrough arrangement of FIGS. 1 and 2 within a wheel drive of a motor vehicle.

FIG. 3 illustrates the use of the rotary feedthrough 6 in a tire filling system of a motor vehicle, preferably an agricultural working vehicle. In this case, an axle tube 51 of the vehicle is embodied as a stator. A supported axle shaft 52 extends within this axle tube. This axle shaft 52 comprises a flange 53, on the end thereof, upon which a wheel disk 54 of a rim 55 is fastened. In the complete state of the wheel, this rim 55 accommodates a non-illustrated wheel, which shall be filled with air or relieved of pressure. In addition, a wheel hub 56 is disposed on the axle shaft 52 in a rotationally locked manner, wherein the coupling 46 (as shown in FIG. 1) proceeds from this wheel hub. This coupling connects the working line 45 to the working channel (explained by reference to FIG. 1) while the working line 45 is connected to the rim 55. As such, the working line extends into the interior of the tire or into the interior of a tube provided in the tire. FIG. 3 also shows that the rotary feedthrough 6 is disposed on the axle tube 51 embodied as a stator, wherein this rotary feedthrough is designed as shown in FIGS. 1 and 2 to provide this function.

LIST OF REFERENCE CHARACTERS 1 stator
2 drive shaft
3 rotor
4 compressed air source
5 consumer
6 rotary feedthrough
7 compressed air line
8 compressed air channel
9 housing of 6
10 coupling
11 actuating element
12 peg
13 annular piston
14 head piece
15 longitudinal bore
16 connecting bore
17 guide bore
18 receiving bore
19 cover
20 control channel
21 control line
22 control unit
23 pressure chamber
24 piston ring
25 cylinder
26 return spring
27 mounting flange
28 screw
29 annular chamber
30 switchable non-return valve
31 plate valve
32 blocking element
33 blocking element
34 side wall of 29
35 side wall of 29
36 ring
37 ring
38 first radially extending section of 36
39 first radially extending section of 37
40 diagonally extending section of 36
41 diagonally extending section of 37
42 second radially extending section of 36
43 second radially extending section of 37
44 working channel
45 working line
46 coupling
47 screw
48 collar of 14
49 concavely curved section of 14
50 keel of 14
51 axle tube
52 axle shaft
53 flange
54 wheel disk
55 rim
56 wheel hub As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A rotary feedthrough for a compressed air supply system is positioned between a stator and a rotor rotating relative the stator, a compressed air channel disposed in the stator is connected to a compressed air line and leads compressed air into an annular chamber formed in the rotor, wherein at least one working channel that leads to a consumer of the compressed air proceeds from the annular chamber;

wherein the stator is connected, in a region of the rotary feedthrough, to a control line;

wherein a switchable non-return valve disposed in the annular chamber is formed with blocking elements extending within the annular chamber concentrically to the rotational axis of the rotor that are moved into an open position by an actuating element; and wherein the actuating element is displaced from the stator in a direction of the blocking elements.

2. The rotary feedthrough according to claim 1, wherein the annular chamber within the rotor is designed as a radial peripheral groove or as an end-face groove.

3. The rotary feedthrough according to claim 2, wherein the actuating element comprises a longitudinally displaceable peg having a head piece and a control element that cooperates with the control line and wherein the head piece engages, radially or axially, into the blocking elements of the non-return valve in order to establish a connection between the compressed air channel and the working channel.

4. The rotary feedthrough according to claim 3, wherein the head piece has a collar comprising longitudinal sides that transition into a keel through concavely curved section.

5. The rotary feedthrough according to claim 3, wherein the actuating element has a longitudinal bore that extends through the peg and the head piece and into which the compressed air channel leads.

6. The rotary feedthrough according to claim 1, wherein the non-return valve is designed as a plate valve.

7. The rotary feedthrough according to claim 6, wherein the blocking elements of the plate valve are designed as profiled annular rings disposed on side walls of the annular chamber, wherein the profiled annular rings include first radially extending sections and diagonally extending sections that proceed respectively from the first radially extending sections and wherein the diagonally extending sections form second radially extending sections that bear against one another in a sealing manner and block a flow of compressed air.

8. The rotary feedthrough according to claim 3, wherein the control element is designed as an annular piston connected to the peg.

9. The rotary feedthrough according to claim 8, wherein the annular piston is acted upon, on at least one end face, by a control pressure from the control channel.

10. The rotary feedthrough according to claim 8, wherein the annular piston includes end faces and wherein a return spring acts on one of the end faces of the annular piston.

11. The rotary feedthrough according to claim 8, wherein the peg is guided, in a receiving bore extending concentrically to the compressed air channel.

12. The rotary feedthrough according to claim 4, wherein the head piece is shaped as a truncated cone.

13. The rotary feedthrough according to claim 4, wherein the head piece tapers in a direction of an end of the head piece and wherein a jacket surface of the head piece has a concave contour or a convex contour, as viewed in a longitudinal sectional view.

14. The rotary feedthrough according to claim 4, wherein the control element has an electromagnetic actuator system.

15. The rotary feedthrough according to claim 1, provided for a tire pressure control unit of a motor vehicle, wherein the stator is fixedly disposed on an axle tube or an axle housing, wherein the rotor is disposed on a wheel hub that rotates relative to the axle tube or axle housing and wherein air pressure in a tire of a drive wheel is adjusted during travel by the switchable non-return valve disposed within the annular chamber.

* * * * *